May 3, 1955 J. W. STEINDORF ET AL 2,707,299
SPATULA CLEANERS
Filed July 3, 1952
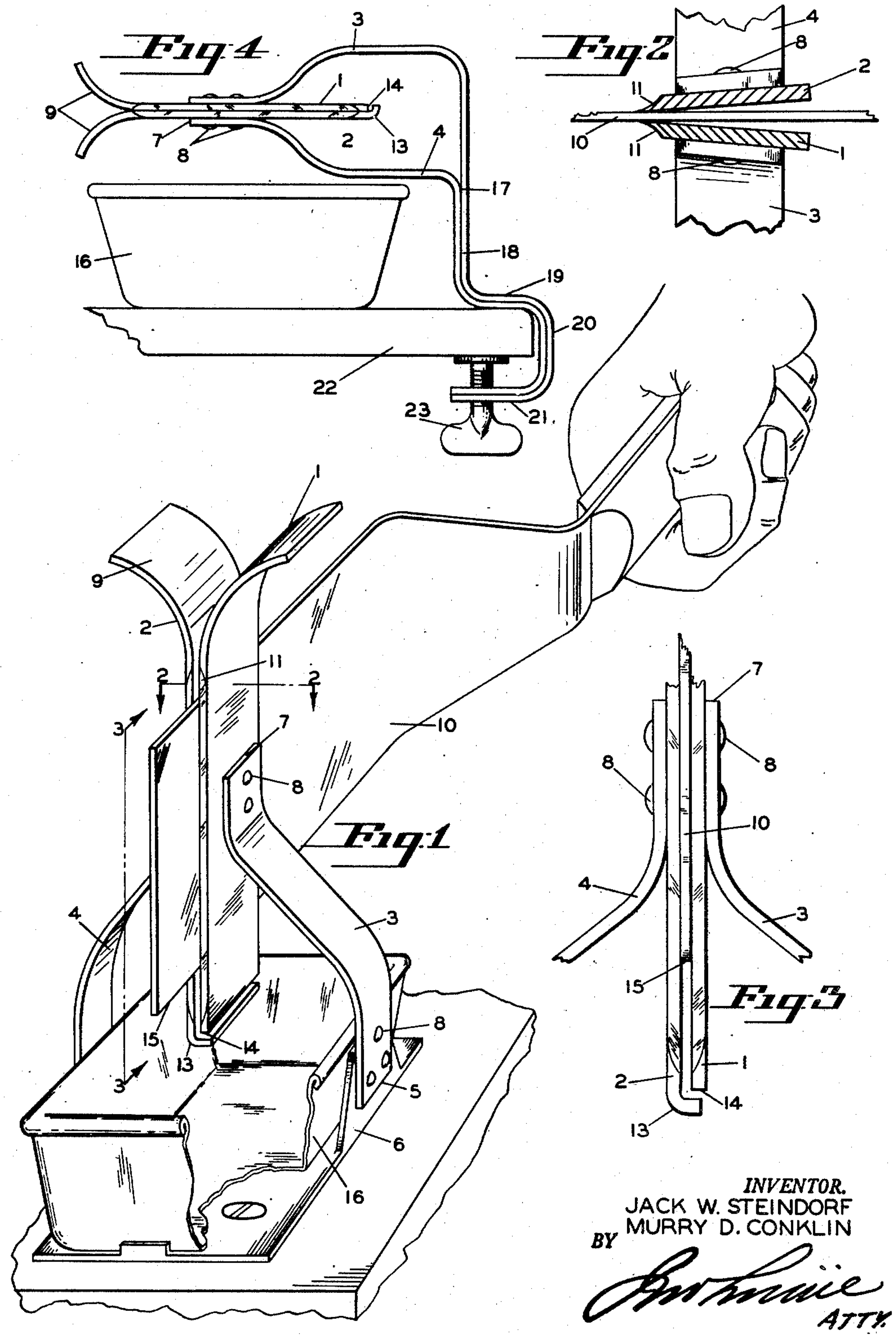
INVENTOR.
JACK W. STEINDORF
MURRY D. CONKLIN
BY [signature] ATTY.

United States Patent Office 2,707,299

Patented May 3, 1955

2,707,299

SPATULA CLEANERS

Jack W. Steindorf and Murray D. Conklin, Corvallis, Oreg.; said Conklin assignor to said Steindorf Application July 3, 1952, Serial No. 296,992

2 Claims. (Cl. 15—236)

This invention relates to spatula cleaners, and is particularly adapted to be used by cooks in restaurants.

The primary object of the invention is to provide a pair of scraping blades through which the spatula is drawn for removing grease, burnt particles and other foreign matter from the spatula.

Our new and improved cleaner consists of oppositely disposed scraping blades mounted to a base, the said base adapted to be connected to any convenient object within reach of the user.

The device also has a drip pan associated therewith for catching the scrapings removed from the spatula.

These and other incidental objects will be apparent in the drawings, specification and claims.

Referring to the drawings:

Figure 1 is a perspective view of our new and improved spatula cleaner mounted to a support, partially broken away for convenience of illustration, the spatula being shown in broken lines.

Figure 2 is a fragmentary detail sectional view, taken on line 2—2 of Figure 1 of the scraping blades, having a portion of a spatula shown therebetween.

Figure 3 is a detail fragmentary sectional view, taken on line 3—3 of Figure 1, having a portion of a spatula inserted therebetween which is not shown in Figure 1.

Figure 4 is another preferred form of our invention. The scraping blades shown on a horizontal plane.

Referring more specifically to the drawings:

Our preferred form of spatula cleaner consists of a pair of scraping blades 1 and 2 mounted in a vertical position to the supporting arms 3 and 4. The said supporting arms being made from a spring material, their lower ends 5 may form part of a base 6, or they may be secured thereto as illustrated. The arms 3 and 4 hold the blades 1 and 2 against each other while scraping the spatula.

The upper ends 7 of the arms are secured to the scraper blades 1 and 2 by any suitable means as rivets 8. The upper ends of the scraper blades are flared out as indicated at 9, best illustrated in Figure 1. This provides a guide for inserting the spatula 10 down into and between the scraper blades, the user of the same giving little thought to guiding the spatula into the scraper.

The forward edge of the scraper bars may be bevelled as illustrated at 11, best illustrated in Figure 2, and the bars may contact the spatula blades at a slight angle as indicated in Fig. 2, providing a more efficient contact of the bevel edge 11 with the spatula blade 10. The lower end of the scraper bar 2 is bent into a right angle bend 13, extending under the lower end 14 of the scraper blade 1. This prevents the lower edge 15 of the spatula from passing down through beyond the lower ends of the scraper blades. Located directly under the scraper blades is a removable drip pan 16 for catching the scrapings removed from the spatula.

Referring to Figure 4, another preferred form of mounting the scraper blades is illustrated wherein the blades 1 and 2 are mounted on a horizontal plane directly above the drip pan 16. The arms 3 and 4 support the blades 1 and 2 forcing them together, the same as illustrated in Figure 1, except that these arms are on a horizontal plane and are turned down and come together at 17, extending down into a vertical position at 18, being bent to a horizontal plane 19, down at 20 and horizontally at 21, providing a clamp for embracing the supporting means 22. A threaded set screw 23 clamps the same to the support as indicated. The arms 3 and 4 could be mounted to a base similar to that shown in Figure 1.

In the operation of our new and improved spatula cleaner, the same is located at any convenient location wherein the user need only, without thinking, swing his arm to the location of the cleaner. The spatula enters between the flared wings 9 of the blades, then enters down between the blades. The user then pulls the spatula through the blades removing grease and drippings therefrom into the drip pan thereunder. The stop or angle 13 prevents the spatula from over-reaching the lower ends of the scraper blades in the scraping of the spatula.

What I claim is:

1. A device for cleaning flat tools such as spatulas, knives, or the like, comprising a flat base having means for securing it to a support, resilient arms secured to the opposite sides of said base and spaced to receive a receptacle between their lower portions, said arms extending upwardly with upper portions thereof extending inwardly, a pair of flat, juxtaposed, confronting, spaced-apart blades supported between the upper ends of the arms, each blade mounted on its nearest arm, said blades being inclined with reference to each other and sharpened on their edges which are closest together, the upper ends of said blades being flared outwardly, to facilitate the insertion of a flat tool between said blades, and means at the lower end of the blades to act as a stop for a flat tool when it is passed between the blades for cleaning.

2. A device for cleaning flat tools such as spatulas, knives or the like, comprising a base having means for securing it to a support, resilient arms carried by said base in spaced relation, said arms extending inwardly toward each other with the free ends of said arms urged toward mutual engagement, a pair of flat, juxtaposed, confronting, spaced-apart blades respectively supported between the free ends of the arms, intermediate the length of said blades, each blade being mounted on its nearest arm, said blades being inclined with reference to each other and sharpened on their edges which are closest together, the outer ends of said blades being flared outwardly to facilitate insertion of a flat tool between said blades, and means at the inner ends of the blades to act as a stop for a flat tool when it is passed between the blades for cleaning.

References Cited in the file of this patent

UNITED STATES PATENTS

| | | |
|---|---|---|
| 830,763 | Bradbury | Sept. 11, 1906 |
| 1,190,547 | Hecke | July 11, 1916 |
| 1,992,423 | Hale | Feb. 26, 1935 |
| 2,140,209 | Rietveld | Dec. 13, 1938 |